United States Patent Office 3,418,982
Patented Dec. 31, 1968

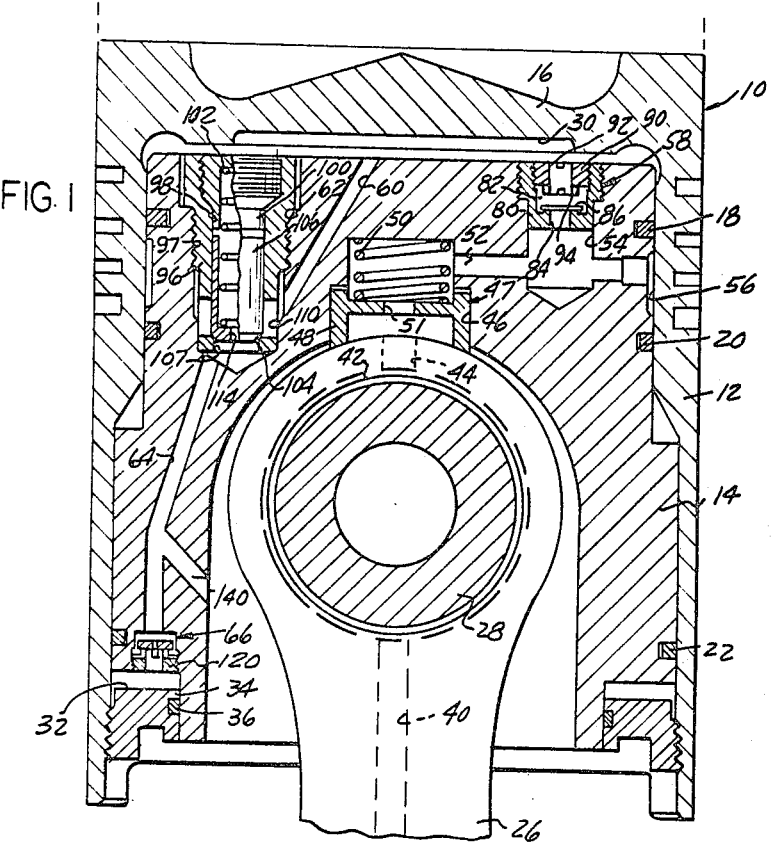

3,418,982
VARIABLE COMPRESSION RATIO PISTON ASSEMBLY
William J. Waugaman, Grosse Pointe Farms, Mich., assignor to Continental Aviation Engineering Corporation, a corporation of Virginia
Filed July 20, 1967, Ser. No. 654,804
8 Claims. (Cl. 123—78)

ABSTRACT OF THE DISCLOSURE

A two-part variable compression ratio piston is provided with an upper and a lower variable volume chamber adapted to contain an incompressible fluid such as oil from the lubrication system of the engine and interconnected to automatically regulate the compression ratio of the engine to maintain a predetermined maximum combustion chamber pressure by moving one of the parts relative to the other.

Background of the invention

The present invention relates to an internal combustion engine particularly to such engines employing means for varying the compression ratio thereof and more particularly to improved means for controlling relative movement of two-part pistons for such engines such as those disclosed in U.S. Patent No. 3,156,162, issued Nov. 10, 1964, to William A. Wallace and Robert E. Pecha; U.S. Patent No. 3,161,112, issued Dec. 15, 1964, to William A. Wallace and Thomas J. Pearsall; U.S. Patent No. 3,185,137, issued May 25, 1965, to Herman T. Dreyer; U.S. Patent No. 3,185,138, issued May 25, 1965, to Frank C. Druzynski; U.S. Patent No. 3,311,096, issued Mar. 28, 1967, to Carl F. Bachle and Roswell E. Carney; and copending application Ser. No. 654,803, filed by assignee herein on July 20, 1967.

In each of the aforesaid patents and in the pending application, a two-part variable compression ratio (VCR) piston is disclosed in which an inner member or carrier is connected in the usual manner to a connecting rod and carries an outer member or shell which is adapted to move axially to a limited extent relative to the inner member. Clearance spaces are provided between the top and bottom ends of the inner and outer members which form upper and lower variable chambers adapted to contain an incompressible fluid such as oil. By controlling the flow of oil to and from these chambers, the movement of the outer member relative to the inner member in response to piston reciprocation and combustion chamber pressure is controlled for varying the clearance volume of the cylinder in which the piston reciprocates in a manner which is apparent from the description in those patents.

In each of those disclosures except the copending application, however, the fluid circuit used for controlling flow to and discharge from the chambers includes valve means which directs the oil from the external source to both the upper and lower chambers. A discharge valve opens a path from the upper chamber upon an excess of pressure being produced in that chamber and the oil from the upper chamber in that event is dumped directly to the crankcase to produce quick response of the piston to excess combustion chamber pressure.

There have been previous attempts to provide two-part VCR piston constructions in which the inlet to the lower chamber is connected directly to the upper chamber. Such an arrangement would have the advantage that oil pumping losses are minimized and that oil which would otherwise escape the system is directed instead to the lower chamber. Patent Nos. 2,573,688 and 2,573,689 to F. D. Butler, issued Nov. 6, 1951, are examples of such arrangements. Such constructions have heretofore had the disadvantage, however, that if they are provided with a restricted orifice discharging from the lower chamber the piston tends to collapse too slowly under excess combustion chamber pressure and if the piston is not provided with a restricted orifice but discharges substantially freely from the lower chamber as in the Butler patents large cyclic movement between the collapsed and expanded positions of the piston is produced each time there is even a small pressure change in the combustion chamber and even during normal operation of the engine.

The aforementioned copending application discloses a construction in which the oil is directed through a one-way inlet valve into the upper or first chamber. A one-way discharge valve is provided intermediate the first chamber and the lower or second chamber and is operable to open upon a sufficient pressure increase in the upper chamber to direct oil into a passage leading to the lower chamber. A one-way inlet valve is provided intermediate the second or lower chamber and the discharge valve and prevents the oil from leaving the lower chamber via the passage between the chambers. A restricted orifice is provided to permit controlled leakage from the lower chamber in the usual manner. The disclosed invention also includes a pressure relief valve means intermediate the discharge valve and the one-way inlet valve to the lower chamber. The pressure relief valve is operable to open a secondary discharge path upon an excess of pressure being produced at the inlet to the second chamber. In this way, a sudden and excess increase in combustion chamber pressure will produce an opening of the pressure relief valve to thereby open a secondary discharge path intermediate the chambers which bypasses the lower chamber so that unlike the Butler patents quick response is provided when needed.

The present disclosure is substantially similar to the aformentioned copending application but is an improvement thereover in that the aforementioned pressure relief valve may be eliminated. Instead a bypass passage is in one embodiment connected directly to the passage intermediate the chambers and is left open at all times. A differential two-way inlet valve is provided at the entrance to the second chamber. A portion of oil discharged from the first chamber will ordinarily flow through the inlet valve to the second chamber and the remaining portion exceeding the lower chamber expansion rate will flow through the bypass passage. This is due to the fact that when it is desirable to have maximum oil flow into the second chamber, that chamber will be expanding and therefore the pressure in the second chamber will be of a lower value than that in the bypass passage. However, due to the smaller cross-sectional area of the lower chamber, its rate of volumetric expansion is considerably less than the volumetric contraction of the first chamber. Also in the present disclosure, the restricted orifice necessary to control leakage from the lower chamber is provided within the inlet valve means so that the regulated discharge is through the bypass passage. Since the restricted orifice produces an upward flow for the leakage there is little tendency for air to be drawn into the lower chamber when that chamber is filling as is the problem with some constructions of these pistons. In a second embodiment of the invention as herein disclosed, the inlet valve mechanism is operable to close the bypass passage and to open the restricted orifice to the lower chamber when pressure in the lower chamber increases. Again the result is that the valving system is substantially simpler than heretofore possible without sacrificing desired operational characteristics of the piston.

It is an object then of the present invention to provide an improved VCR piston construction which permits the use of a more simplified valving arrangement for operation of the piston.

It is another object of the present invention to provide a VCR piston construction in which discharge from the upper chamber is normally directed to the lower chamber but in which quick response to excessive combustion chamber pressure is achieved by providing a secondary discharge path which drains excess oil directed from the upper chamber to the lower chamber.

It is another object of the present invention to improve VCR pistons such as those disclosed in the aforementioned patents by reducing oil pumping losses by providing means discharging at least a portion of the oil from the upper chamber to a lower chamber upon an excess combustion pressure being produced.

Still further objects and advantages of the present invention will be readily apparent upon reference to the following description of several preferred embodiments thereof and which refers to the accompanying drawings in which like characters refer to like parts throughout the several views and in which:

FIG. 1 is a vertical cross-sectional view taken through the axis of a VCR piston embodying the construction of the present invention, FIG. 2 is an enlarged fragmentary cross-sectional view illustrating a portion of the piston shown in FIG. 1, FIG. 3 is an enlarged elevational view of the valve plate member illustrated in FIGS. 1 and 2, FIG. 4 is an enlarged fragmentary cross-sectional view similar to portions illustrated in FIG. 1 but illustrating another preferred construction of the inlet valve assembly disclosed therein in one operating position, and FIG. 5 is a fragmentary cross-sectional view similar to FIG. 4 but illustrating the inlet valve assembly in another operating position.

Description

Now referring to the drawings for a more detailed description of the present invention, FIG. 1 illustrates a preferred construction of a VCR piston 10 adapted for use use in an internal combustion engine. The piston 10 comprises an outer member or shell 12 which is carried on an inner member or piston pin carrier 14. The outer member 12 has a crown 16 which serves as the head of the piston 10 and which forms a movable wall of the lower boundary of a combustion chamber of the engine. The inner member 14 is axially slidable within and with respect to outer member 12 and is provided with rings 18, 20 and 22 which sealingly engage the inner surface of the outer member 12. Inner member 14 is linked to the crankshaft of the engine by a connecting rod 26 and a wrist pin 28 in the conventional manner. Thus, the inner member 14 is movable axially betwen fixed upper and lower limits in the manner of a conventional piston while the outer member 12 can move axially upwardly and downwardly relative to the inner member 14 within limits which will be presently described.

An upper variable volume chamber 30 is formed intermediate the upper surface of the inner member 14 and the lower surface of the crown 16. A lower variable volume chamber 32 is formed intermediate a lower surface formed by an annular recess at the lower end of the inner member 14 and by the upper surface of the ring 34 fixed to the outer member 12. A sealing ring 36 prevents fluid leakage from the lower chamber 32 intermediate the adjacent surfaces of the inner member 14 and the ring 34.

The ring 34 and the lower surface of the crown 16 defining the chamber 30 provide the limits of axial movement of the outer member 12 relative to the inner member 14. This relative movement provides a variable height from the center of the wrist pin 28 to the top of the piston crown 16 to thereby vary the compression ratio of the engine by varying the clearance volume of the combustion chamber substantially in the manner disclosed in the aforementioned patents.

This movement of the outer member 12 relative to the inner member 14 is automatically controlled by regulation of the flow of an incompressible fluid into and out of the chambers 30 and 32.

It is clear that separation of member 12 upwardly (as viewed in FIG. 1) from member 14 expands chamber 30 while contraction of these members expands chamber 32. The control fluid preferably comprises oil supplied to the piston 10 from the usual pressurized lubricating oil supply of the engine via an oil passage 40 in the connecting rod 26. Passage 40 preferably connects with an annular groove 42 encircling the piston pin 28 and leading to an outlet 44 connected to a cavity 46 formed in member 14. A slipper collector assembly generally indicated at 47 similar to that disclosed in the aforementioned patents preferably comprises a collector cap 48 carried in the cavity 46 and urged by a spring 50 into sealing engagement with the upper surface of the connecting rod 26 so that oil is directed through the outlet 44 into the interior of the cap 48 in all positions of the connecting rod 26 with respect to the axis of the pin 28. An opening 51 is provided in the collector cap 48 which directs the oil to a passage 52 formed in the inner member 14 and connecting across a vertical passage 54 to an annular cooling chamber 56 formed in the outer surface of the inner member 14 adjacent the piston pin ring area of member 12. The passage 54 connects with the upper chamber 30 through a one-way inlet valve assembly generally indicated at 58.

Communication between the upper chamber 30 and the lower chamber 32 is afforded through an inclined passage 60 connecting with a passage 64 through a discharge valve assembly generally indicated at 62. An inlet valve assembly generally indicated at 66 and as can best be seen in FIG. 2 is positioned intermediate the passage 64 and the lower chamber 32.

The valve assembly 58 is substantially a one-way check valve of a convetnional construction and preferably comprises a cylindrical casing member 80 threadably received in the passage 54 and having an inner chamber 82 registering with the passage 54 through an axial passage 84. A plate 86 is carried within the chamber 82 normally in a position extending across the axial passage 84 and thus closing oil flow therethrough. An inner member 90 is threadably received within the casing member 80 and is provided with an axial passage 92 communicating the chamber 30 with the inner chamber 82. A cylindrical boss 94 with arcuate removed sections defines the connection between the passage 92 and the chamber 82. It is clear that the valve assembly 58 permits oil to flow from the passages 52 and 54 to the upper chamber 30 but does not permit a reverse flow from the chamber 30 to the passage 54. Oil flow acting upon the lower face of the valve plate 86 moves the plate 86 from its seat upwardly against the boss portion 94. Since the plate 86 is of the smaller diameter than the inner wall defining the chamber 82 oil will flow around the outer edge of the plate 86, through the removed sections of the boss 94 and through the passage 92 into the upper chamber 30. The pressure acting upon the upper face of the valve plate 86 tending to produce a reverse flow of fluid from the chamber 30 to the passage 54 urges the plate 86 against the lower portion of the member 80 and thus closes the passage 84 to block oil flow from the chamber 30 through the valve assembly 58.

The valve assembly 62 preferably comprises a substantially cylindrical casing 96 preferably, threadably received in a bore 97 which intersects the passages 60 and 64. The casing 96 is provided with an inner axial cavity 98 which provides the means for positioning a spring retainer 100 providing a seat for one end of a spring 102 urging a chamfered face 104 of a valve member 106 against a seat 107 formed in the casing member 96. A passage 114 is provided in the end of the valve member 106 so that even in a closed position of the valve member 106 the oil pressure on that portion of the valve 106 disposed within the passage 64 is equal to that in the interior of the valve member 106. The passage 60 intersects an annular chamber 110 encompassing the bore 97 upwardly of the valve face 104 and seat 107 so that the valve member 106 normally closes fluid flow from the passage 60 through the chamber 110 to the passage 64. In this way, the valve member 106 is movable against the spring 102 only in response to increases in pressure within the chamber 110 acting upon that portion of the chamfered face 104 disposed within the chamber 110. When this pressure reaches a predetermined increase sufficient to overcome the spring 102 the valve 106 will open and oil will flow from the chamber 30 via the passage 60 and chamber 110 past the open valve 106 into the passage 64.

The valve assembly 66 is similar in construction to the valve assembly 58 but is disposed in a direction reverse to the valve assembly 58. As can best be seen in FIGS. 2 and 3 the valve assembly 66 comprises a plug 120 carried in an enlarged portion of the passage 64 adjacent its entrance to the lower chamber 32. The plug 120 is provided with an axial passage 122 encompassed at its upper edge by a boss 124 having arcuately removed sections 126. A plate 128 which can best be seen in FIG. 3 is substantially triangularly shaped having rounded corner edges 130 and is disposed within the chamber 134 formed intermediate the plug 120 and the passage 64. The plate 128 is provided with a centrally disposed restricted orifice 136.

A discharge passage 140 connects the passage 64 intermediate the valve assemblies 62 and 66 with the crankcase of the engine.

*Operation*

Assuming that the combustion chamber pressure is below a predetermined maximum value which the VCR piston 10 is designed to maintain and that the upper and lower chambers 30 and 32 are both filled with oil, during the latter part of each upward stroke of the piston 10 at the end of the exhaust stroke and the early part of each downward intake stroke the momentum of the outer member 12 tends to force it upwardly relative to inner member 14 thereby tending to expand chamber 30 and contract chamber 32. The resulting increase in oil pressure in chamber 32 will cause the valve plate 128 to move to the position illustrated in FIG. 2 so that oil flow from the chamber 32 will only be permitted through the restricted orifice 136 formed in the plate member 128. The controlled discharge through the restricted orifice 136 and thus through the discharge passage 140 then permits a gradual cyclic decrease in the volume of the chamber 32 and a correspondingly greater increase in the volume of the chamber 30 to provide a relative upward movement between the outer member 12 and the inner member 14. As the upper chamber 30 increases in volume, oil from the lubrication system of the engine is directed through the valve assembly 58 into the upper chamber 30 to maintain that chamber in a filled condition.

Thus, as in the previously disclosed construction, the controlled leakage of oil from the lower chamber 32 through the restricted orifice 136 and from there through the discharge passage 140 permits the outer piston 12 to move upwardly a very small distance relative to the inner member 14 on each cycle of engine operation as long as a predetermined combustion pressure is not exceeded. During the compression and power strokes of the engine the tendency of the outer member 12 to move upwardly with respect to the inner member 14 as produced by inertia is resisted by gas pressure on the piston crown so that during these strokes of the engine cycle there is little if no relative movement between the inner and outer members. The operation of the valve assembly 58 traps the oil in the upper chamber 30 when it is closed by a pressure increase in the upper chamber 30 so that as long as the pressure within the chamber 30 is less than that at which the valve assembly 62 is designed to open the oil is trapped in the chamber 30 and the outer member 12 is prevented from moving back downwardly relative to the inner member 14. In this way, upward movement of the outer piston 12 relative to the inner piston 14 may occur for several cycles to thereby increase the compression ratio of the engine. This will continue until the combustion chamber pressure reaches a predetermined maximum value which will open a discharge path from the chamber 30 in a manner which will now be described.

If the combustion chamber pressure is increased beyond a predetermined value it will act on the crown 16 to urge the outer member 12 downwardly with respect to the inner member 14 to increase the pressure within the chamber 30 and decrease it within chamber 32. This increase in pressure in chamber 30 if sufficient will act through the passage 60 and the chamber 110 to open the valve member 106 and direct oil from the passage 64 and the open valve assembly 66 into the lower chamber 32. As long as the chamber 32 is expanding, the oil being delivered from the passage 64 is in excess of that needed to fill the vacuum produced by the expanding chamber 32. Hence more than enough oil is discharged from the chamber 30 to maintain chamber 32 filled and flow will tend to be toward chamber 32 since the pressure in chamber 32 will be less than that present in discharge passage 140. It is clear then that during normal engine operation a state of relative equilibrium will exist wherein the outer member 12 will move up and down very slightly relative to the inner member 14 during each cycle with its mean relative position being that producing the maximum combustion chamber pressure as predetermined by the setting of the valve assembly 62. In such normal operation there will be very little oil pumping losses since the system will operate as substantially a closed system with the only leakage being that leaking from the cooling chamber 56 and from the restricted orifice 136 provided in the valve plate 128. Unlike the previous constructions since the oil will not normally be discharged directly from the chamber 30 to the crankcase of the engine but is instead directed to the lower chamber 32 the resultant pumping losses will not occur.

If the combustion chamber pressure is suddenly increased by opening the engine throttle or by increasing the load on the engine, the hydraulic circuitry of the present invention is designated so that the outer member 12 can move rapidly downwardly relative to the inner member 14 thereby increasing the clearance volume and thus quickly reducing the combustion chamber pressure to the desired maximum value. This is achieved through the discharge passage 140 communicating with the passage 64. In such an event, the chamber 32 since it is less in volume than the chamber 30 is expanding its capacity for taking the oil discharged from chamber 30 at a slower rate than the rate of volumetric contraction of chamber 30 and hence the excess oil will flow via the discharge passage 140 directly to the crankcase sump.

The particular construction of the plate 128 provides maximum flow through the assembly when it is in the open position and yet the triangular construction of the plate tends to maintain the plate in a centered position so that flow is provided only through the restricted orifice 136 when the valve assembly is in the position illustrated in FIG. 2.

FIGS. 4 and 5 disclose an arrangement which can be substituted for the valve assembly 66 and the discharge passage 140. In this construction, a valve member 200 is provided which is movable within a chamber 202 formed at the entrance of the lower chamber 32. A plug 204 limits downward movement of the valve member 200 and the valve 200 and plug 204 are provided with axial passages 206 and 208 respectively and which are in communication at each position of the valve 200. The valve 200 is movable from a position in which an upper extension 210 closes a discharge passage 212 and opens a restricted orifice 214 to the chamber 202 intermediate the valve 200 and the plug 204 as shown in FIG. 5 and to a position in which the entrance to the restricted orifice 214 is closed and communication is open between the discharge passage 212 and the passage 64 as shown in FIG. 4.

The valve assembly of FIGS. 4 and 5 tends to be moved to the position illustrated in FIG. 4 in those steps in the operation of the piston in which the chamber 32 is tending to expand. Again in such situations since the pressure in chamber 32 will normally be lower than that of the crankcase sump part of the oil will tend to bypass the discharge passage 212 and will flow through passages 206 and 208 to fill the chamber 32. In those situations when the chamber 32 in tending to contract the valve mmeber 200 will be moved to the position illustrated in FIG. 5. This is due to valve 200 operating as a differential piston spool valve such that balanced oil pressure acting simultaneously on the oppositely facing differential working areas results in an unbalanced force tending to move valve 200 upwardly to its FIG. 4 position. In this position the discharge passage 212 will be closed and the retricted orifice 214 will be opened to provide the necessary controlled leakage from chamber 32. While a path will be opened directly from chamber 32 to the passage 64 this is of no consequence since the valve assembly 62 will maintain the path between chamber 32 and 30 closed. It is clear that in the event of excess combustion chamber pressure, the chamber 32 will be kept filled and the excess oil flowing from chamber 30 will be discharged through the discharge passage 212.

It is apparent that a construction for VCR pistons somewhat similar to those disclosed in the aforementioned patents has been described herein. Unlike those previously disclosed VCR pistons, however, the present disclosure provides a much more simplified arrangement in that fewer and simpler valves can be employed for the automatic regulating means without sacrificing reliability or the desired operating characteristics of the piston. Further, by normally discharging oil from the upper chamber directly to the lower chamber and only discharging excess oil directly to the crankcase from the upper chamber the desired operating characteristics of the piston have been achieved without the inefficiencies of engine operation produced by oil pressure losses. Thus, reduced power losses from the system tend to reduce the horsepower of the engine diverted to produce the regulation of the piston and tend to cause an increase in the final shaft output of the engine. A smaller oil pump can be used increasing engine output capabilities and reducing the size and weight characteristics of the engine.

It is also apparent that although I have described several embodiments of the present invention other changes and modifications can be made therein without departing from the spirit of the invention or the scope of the appended claims.

I claim:

1. In a variable compression ratio piston for an internal combustion engine having an inner member and an outer member movable relative to one another to vary the compression ratio of the engine, a control system for regulating movement of said members comprising,
    (a) means defining a first chamber and a second chamber within said piston, said first and second chambers varying oppositely in volume in response to said movement of said members,
    (b) means for supplying a pressure fluid to said first chamber and means for discharging fluid from said first chamber to said second chamber upon a predetermined pressure increase in said first chamber,
    (c) a secondary discharge path disposed intermediate said first and second chamber,
    (d) said second chamber having an inlet,
    (e) passage means normally directing said discharge fluid from said first chamber to said inlet and also to said secondary discharge path, and
    (f) valve means including orifice means, said valve means being carried in said inlet and movable to a first position admitting fluid from said passage means through said inlet in response to an increase in the volume of said second chamber and movable upon a predetermined increase in pressure being produced in said second chamber to a second position providing a restricted discharge path from said second chamber through said inlet and through said orifice means to an area of lower pressure than said second chamber.

2. The combination as defined in claim 1, and in which
    (a) said discharge means comprises a pressure regulating discharge valve in registry with said first chamber and operable to open to discharge fluid from said first chamber only when fluid pressure in said first chamber has increased to a predetermined value, and
    (b) said valve means comprising a substantially unidirectional valve member operable to open in a direction permitting fluid flow from said first chamber into said second chamber and to close upon fluid flow in a direction from said second chamber toward said first chamber,
    (c) said orifice means being provided in said unidirectional valve member and providing a path between said inlet and said passage means at both the opened and closed positions of said valve member.

3. The combination as defined in claim 2, and in which said secondary discharge means comprises a passage intermediate said discharge valve and said unidirectional valve member and opening to the crankcase of the engine.

4. The combination as defined in claim 1, and in which
    (a) said discharge means comprises, a pressure regulating discharge valve in registry with said chamber and operable to discharge fluid from said first chamber only when fluid pressure in said first chamber has increased to a predetermined value,
    (b) said inlet valve means comprises a valve member disposed at the inlet to said second chamber and operable to move intermediate said first position and said second position upon an increase in the pressure within said second chamber.
    (c) said passage means further comprises a passageway closed by said valve member in said first position and opened by said valve member in said second position, and
    (d) said orifice means communicating with said second chamber and being opened by said valve member in said first position and closed by said valve member in said second position.

5. The combination as defined in claim 4, and in which said valve member includes means moving said valve member intermediate said first and second position in response to changes in the pressure differentials across said valve member.

6. In a variable compression ratio piston for an internal combustion engine having a carrier member adapted for connection via a wrist pin to a connecting rod of the engine and an outer piston member carried on and movable axially relative to the carrier member so that the crown of the outer piston member forms a variable boundary of the piston in the combustion chamber of a cylinder of the engine in which said piston reciprocates to thereby vary the clearance volume by movement of the crown relative to the wrist pin center of the connecting rod, the combination therewith of a hydraulic control system for said piston said control system comprising,
    (a) a first hydraulic chamber defined between said crown and an adjacent first surface of said carrier member and a second hydraulic chamber defined between a second surface of said carrier member and an adjacent surface of said outer piston member, said first and second chambers varying oppositely in volume in response to said movement of said outer piston relative to said carrier member, and
    (b) means for supplying pressure fluid from a source to said first chamber including a unidirectional flow valve permitting flow into said first chamber, (c) said second chamber having an inlet, a passage connecting said first chamber to said inlet of said second chamber, a pressure regulating discharge valve in said passage permitting fluid flow into said passage from said first chamber only when fluid pressure in said first chamber exceeds a predetermined value, (d) means for discharging fluid from said passage bypassing said second chamber to relieve fluid excess of that required to fill said second chamber, and (e) means associated with said second chamber and operable to provide a restricted path discharging from said second chamber and through said inlet when the pressure in said second chamber exceeds the pressure in said first chamber.

7. The combination as defined in claim 6, in which said last mentioned means comprises a substantially unidirectional flow valve disposed within said inlet to said second chamber and movable to a first position permitting fluid flow into said second chamber and moving to a second position upon the pressure increasing within said second chamber to a predetermined value, a restricted orifice associated with said valve member and said second position of said valve member closing fluid flow from said second chamber except through said restricted orifice.

8. The combination as defined in claim 6, and in which said last mentioned means comprises a valve member disposed in the inlet to said second chamber, a discharge passage and a restricted orifice associated with said valve member such that in one position of said valve member said discharge passage is closed from communication with said passage intermediate said chamber and said restricted orifice is opened for communication with said second chamber and at a second position of said valve member said discharge passage is open and said restricted orifice is closed.

References Cited

UNITED STATES PATENTS

| 2,910,826 | 11/1959 | Mansfield | 123—48 XR |
| 3,156,162 | 11/1964 | Wallace et al. | 123—48 XR |
| 3,161,112 | 12/1964 | Wallace et al. | 123—48 XR |
| 3,185,137 | 5/1965 | Dreyer | 123—48 |
| 3,185,138 | 5/1965 | Druzynski | 123—48 |
| 3,303,831 | 2/1967 | Sherman | 123—78 |
| 3,311,096 | 3/1967 | Bachle et al. | 123—78 |

WENDELL E. BURNS, *Primary Examiner.*

U.S. Cl. X.R.

123—48